US011993473B2

(12) United States Patent
Serikawa et al.

(10) Patent No.: US 11,993,473 B2
(45) Date of Patent: May 28, 2024

(54) SHEET TRANSPORT DEVICE, IMAGE READING DEVICE, AND IMAGE FORMING APPARATUS

(71) Applicant: FUJIFILM Business Innovation Corp., Tokyo (JP)

(72) Inventors: Masato Serikawa, Kanagawa (JP); Takakiyo Toba, Kanagawa (JP); Yosuke Takahashi, Kanagawa (JP); Isamu Adachi, Kanagawa (JP); Yuta Abe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 1139 days.

(21) Appl. No.: 16/540,064

(22) Filed: Aug. 14, 2019

(65) Prior Publication Data

US 2020/0299087 A1 Sep. 24, 2020

(30) Foreign Application Priority Data

Mar. 20, 2019 (JP) ................................ 2019-052037

(51) Int. Cl.
*B65H 1/04* (2006.01)
*B65H 7/10* (2006.01)
(Continued)

(52) U.S. Cl.
CPC ................ *B65H 1/04* (2013.01); *B65H 7/10* (2013.01); *B65H 31/04* (2013.01); *B65H 31/36* (2013.01); *G03G 15/6567* (2013.01); *B65H 2405/114* (2013.01); *B65H 2511/12* (2013.01); *G03G 2215/00561* (2013.01)

(58) Field of Classification Search
CPC .......... B65H 1/04; B65H 31/04; B65H 31/08; B65H 31/10; B65H 31/36; B65H 2405/114; B65H 2405/1144; B65H 2405/12; B65H 2511/12
See application file for complete search history.

(56) References Cited

U.S. PATENT DOCUMENTS

2004/0188912 A1* 9/2004 Kobayashi ............ B65H 31/34 271/3.14
2005/0184448 A1* 8/2005 Aoyagi ................ B65H 31/10 271/110
(Continued)

FOREIGN PATENT DOCUMENTS

JP H11222345 8/1999

*Primary Examiner* — Prasad V Gokhale
(74) *Attorney, Agent, or Firm* — JCIPRNET

(57) ABSTRACT

A sheet transport device includes a sheet load tray on which a sheet is loaded, a side-edge positioning unit, and a regulating unit. The side-edge positioning unit comes into contact with a side edge of the sheet in a direction intersecting a sheet transport direction at an upper surface of the sheet load tray and positions the side edge of the sheet to a normal position. The regulating unit is provided in a rotatable manner about a rotation shaft at a lower surface of the sheet load tray and regulates an output position of the sheet by rotating a stopper of the regulating unit to a position where the stopper is capable of colliding with a downstream edge of the sheet to be output in an output direction when the side-edge positioning unit moves to a position corresponding to a minimum width of the sheet.

8 Claims, 12 Drawing Sheets

(51) Int. Cl.

| | |
|---|---|
| ***B65H 31/04*** | (2006.01) |
| ***B65H 31/36*** | (2006.01) |
| ***G03G 15/00*** | (2006.01) |

(56) References Cited

U.S. PATENT DOCUMENTS

2009/0179375 A1* 7/2009 Tamura .................. B65H 31/20
271/221
2020/0223650 A1* 7/2020 Heineck ................... B65H 1/04

* cited by examiner

SHEET TRANSPORT DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2019-052037 filed Mar. 20, 2019.

BACKGROUND

(i) Technical Field

The present disclosure relates to sheet transport devices, image reading devices, and image forming apparatuses.

(ii) Related Art

Japanese Unexamined Patent Application Publication No. 11-222345 discloses a known automatic document feeding device including a feed tray on which a document is placed, a feeder that feeds the document on the feed tray to a transport path, a transport unit that guides the fed document to an image read position, an output unit that outputs the read document onto an output tray, and a controller that variably sets the output speed after the document reading process relative to the transport speed during the document reading process. In this automatic document feeding device, if the transport speed during the document reading process is within a predetermined range, the output speed after the document reading process is controlled to be equal to the transport speed during the document reading process. If the transport speed during the document reading process is outside the predetermined range, the output speed after the document reading process is controlled to be within the predetermined range.

SUMMARY

Aspects of non-limiting embodiments of the present disclosure relate to a sheet transport device, an image reading device, and an image forming apparatus that are capable of suppressing disorderly orientation of small-size sheets output on an output tray, as compared with a configuration not equipped with a regulating unit that regulates the output position of a sheet by rotating or moving a stopper thereof to a position where it is capable of colliding with the downstream edge of the sheet to be output in the output direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including a sheet load tray on which a sheet is loaded, a side-edge positioning unit, and a regulating unit. The side-edge positioning unit comes into contact with a side edge of the sheet in a direction intersecting a sheet transport direction of the sheet loaded on the sheet load tray at an upper surface of the sheet load tray and that positions the side edge of the sheet to a normal position. The regulating unit is provided in a rotatable manner about a rotation shaft at a lower surface of the sheet load tray and regulates an output position of the sheet by rotating a stopper of the regulating unit to a position where the stopper is capable of colliding with a downstream edge of the sheet to be output in an output direction when the side-edge positioning unit moves to a position corresponding to a minimum width of the sheet.

BRIEF DESCRIPTION OF THE DRAWINGS

Exemplary embodiments of the present disclosure will be described in detail based on the following figures, wherein.

DETAILED DESCRIPTION

The present disclosure will be described in further detail below with reference to exemplary embodiments and specific examples. However, the present disclosure is not to be limited to these exemplary embodiments and specific examples.

Furthermore, in the following description with reference to the drawings, it should be noted that the drawings are schematic and that the dimensional ratios are different from the actual dimensional ratios. For providing an easier understanding, components other than those necessary for the description are omitted, where necessary.

First Exemplary Embodiment

1. Overall Configuration and Operation of Image Forming Apparatus

Figure 1:
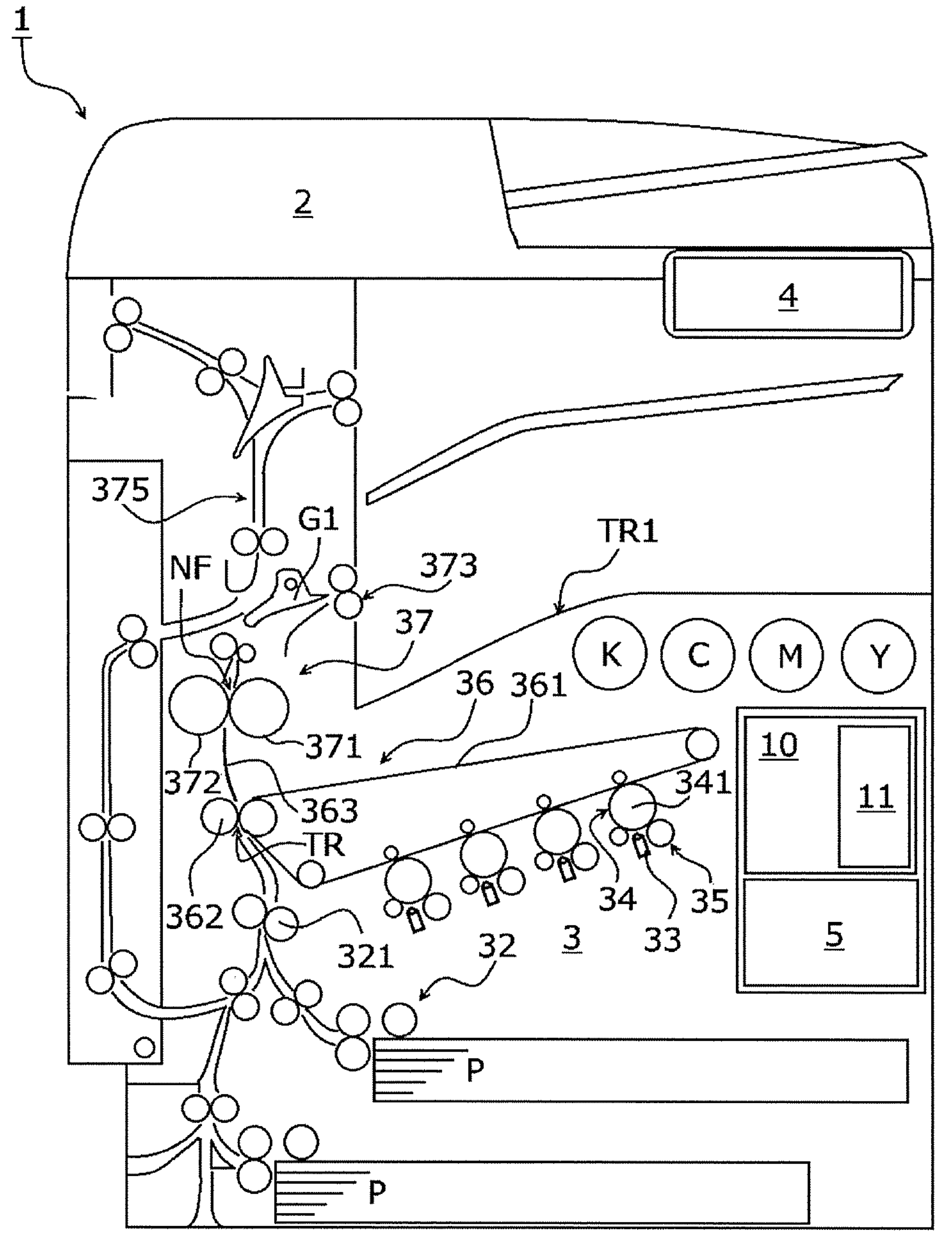
FIG. 1 is a cross-sectional view schematically illustrating the internal configuration of an image forming apparatus.
Figure 2:
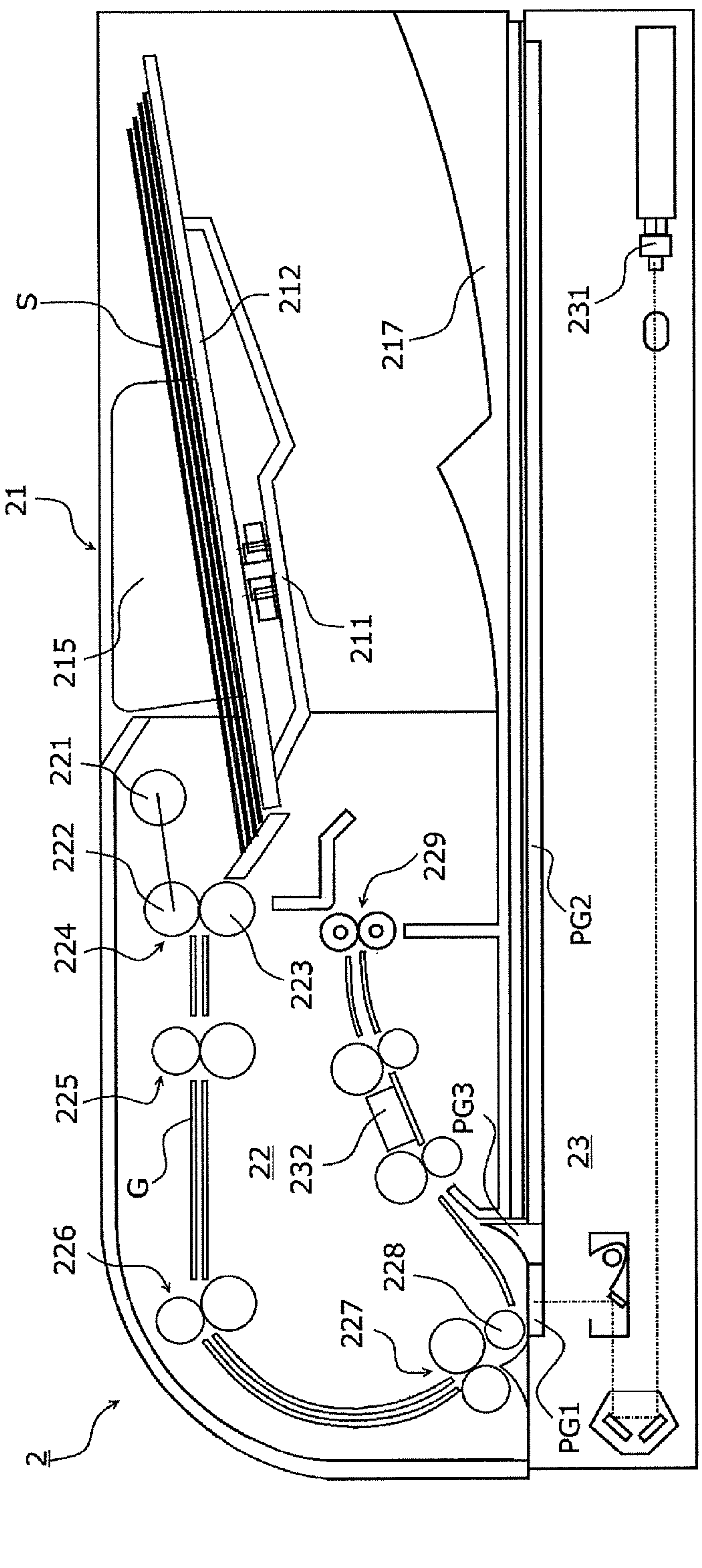
FIG. 2 is a cross-sectional view illustrating the internal configuration of an image reading device.
Figure 3:
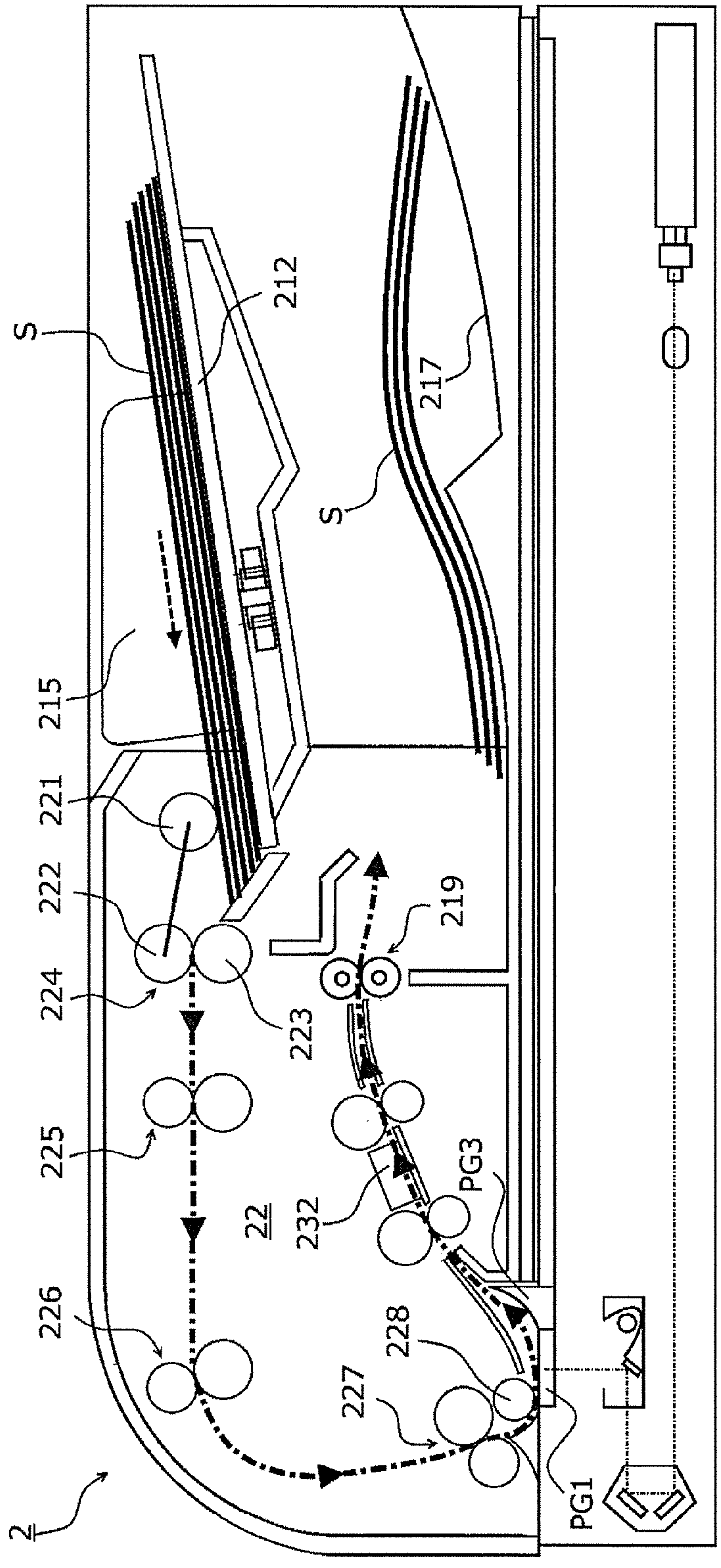
FIG. 3 is a cross-sectional view schematically illustrating how sheets are transported in the image reading device.

FIG. 1 is a cross-sectional view schematically illustrating the internal configuration of an image forming apparatus 1 according to a first exemplary embodiment. FIG. 2 is a cross-sectional view illustrating the internal configuration of an image reading device 2. FIG. 3 is a cross-sectional view schematically illustrating how sheets are transported in the image reading device 2. The overall configuration and the operation of the image forming apparatus 1 will be described below with reference to the drawings.

1.1. Overall Configuration

The image forming apparatus 1 includes an image reading device 2 that reads an image from a sheet and converts it into image data, an image forming unit 3 as an image recorder that prints the read image data onto paper as a recording medium, an operational information unit 4 as a user interface, and an image processor 5.

The image reading device 2 includes a sheet load section 21, an automatic sheet feeder 22, and an image reader 23 as an example of an imaging unit. The automatic sheet feeder 22 transports the sheet S placed on the sheet load section 21 to a read position of the image reader 23. An image read by an image sensor (not shown), such as a charge-coupled device (CCD) line sensor, of the image reader 23 is converted into image data as an electric signal.

The image forming unit 3 includes a paper feeding device 32, exposure devices 33, photoconductor units 34, developing devices 35, a transfer device 36, and a fixing device 37, and forms image information received from the image processor 5 as a toner image onto paper P fed from the paper feeding device 32.

The operational information unit 4 as a user interface is disposed on the front surface of the image reading device 2. The operational information unit 4 is constituted of a combination of, for example, a liquid crystal display panel, various control buttons, and a touchscreen. A user of the image forming apparatus 1 may input various settings and a command via the operational information unit 4 as an example of a receiving unit. Moreover, various types of information are displayed to the user of the image forming apparatus 1 via the liquid crystal display panel.

The image processor 5 generates image data from the image read by the image reading device 2 and from print information transmitted from an external apparatus (such as a personal computer).

1.2. Image Forming Unit

Paper P designated in a print job for each printing process is fed from the paper feeding device 32 to the image forming unit 3 in accordance with an image formation timing of the image forming unit 3.

The photoconductor units 34 individually include photoconductor drums 341 that are provided parallel to one another above the paper feeding device 32 and that are rotationally driven. The developing devices 35 form yellow (Y), magenta (M), cyan (C), and black (K) toner images on the corresponding photoconductor drums 341 having electrostatic latent images formed thereon by the exposure devices 33.

The toner images formed on the photoconductor drums 341 of the respective photoconductor units 34 are sequentially electrostatically transferred (first-transferred) onto an intermediate transfer belt 361 of the transfer device 36, so that a superposed toner image constituted of toners of the respective colors is formed. The superposed toner image on the intermediate transfer belt 361 is collectively transferred by a second-transfer roller 362 onto the paper P transported from a pair of registration rollers 321 and guided by a transport guide.

In the fixing device 37, a fixation nip FN (fixation region) is formed by a pressure contact area of a pair of heating module 371 and pressing module 372.

The paper P having the toner image collectively transferred thereon by the transfer device 36 is transported to the fixation nip FN of the fixing device 37 via a transport guide 363 in a state where the toner image is not fixed on the paper P yet. Then, the pair of heating module 371 and pressing module 372 fixes the toner image onto the paper P in accordance with heating and pressing functions.

The paper P having the fixed toner image formed thereon is guided to a switch gate G1 and is output from a first pair of output rollers 373 so as to be accommodated in a paper output tray TR1 at the upper surface of the image forming apparatus 1. If the paper P is to be inverted for duplex printing or is to be output with the image recorded face thereof facing upward, the transport direction of the paper P is switched toward a transport path 375 by the switch gate G1.

1.3. Image Reading Device

The image reading device 2 includes the sheet load section 21, the automatic sheet feeder 22, and the image reader 23. The sheet load section 21 and the automatic sheet feeder 22 are connected to each other in an openable and closable manner above the image reader 23.

The sheet load section 21 includes a sheet tray 212 on which one or more sheets S having images recorded thereon are placed.

The automatic sheet feeder 22 includes the nudger roller 221 that fetches the sheets S loaded on the sheet tray 212 sequentially from the top, and also includes a separator 224 constituted of a feed roller 222 and a retardation roller 223.

In the separator 224, the feed roller 222 and the retardation roller 223 form a pair that separates sheets S from each other, if multiple stacked sheets S are fed to a nip N, so as to transport the sheets S one-by-one to the image reader 23.

In a transport path G, a takeaway roller 225 is disposed at a position downstream of the feed roller 222 in the transport direction of the sheet S. The takeaway roller 225 transports the sheet S fed by the feed roller 222 to a pre-registration roller 226.

A registration roller 227 that adjusts the transport timing of the sheet S is disposed downstream of the pre-registration roller 226. The pre-registration roller 226 corrects a skew of the sheet S by forming a loop in a state where the leading edge of the sheet S is in abutment with the registration roller 227 in a stopped state. The registration roller 227 is rotationally driven in accordance with a timing for starting a reading process. In a state where the loop of the sheet S is maintained by the transport roller 225 and the pre-registration roller 226, the sheet S is pressed against a sheet passing surface PG1 by a platen roller 228 so that the front face of the sheet S is read by the image reader 23.

A sheet placement surface PG2 that supports a sheet S placed thereon by an operator is disposed to the right of the sheet passing surface PG1. A sheet guide PG3 is disposed between the sheet passing surface PG1 and the sheet placement surface PG2. The sheet S passing over the sheet passing surface PG1 is guided to the sheet guide PG3 so as to be transported to a read sensor 232. The sheet S whose front face is read by the image reader 23 is output by an output roller 229 to an output section 217 provided below the sheet load section 21, while the rear face of the sheet S is read by the read sensor 232.

An image reading sensor 231 that optically reads an image of a sheet S and converts it into an electric signal is provided below the sheet placement surface PG2. Specifically, the image reading sensor 231 reads an image from a sheet S passing over the sheet passing surface PG1 or from a sheet S placed on the sheet placement surface PG2. The read image is converted into image data as an electric signal.

2. Configuration and Operation of Sheet Load Section

Figure 4:
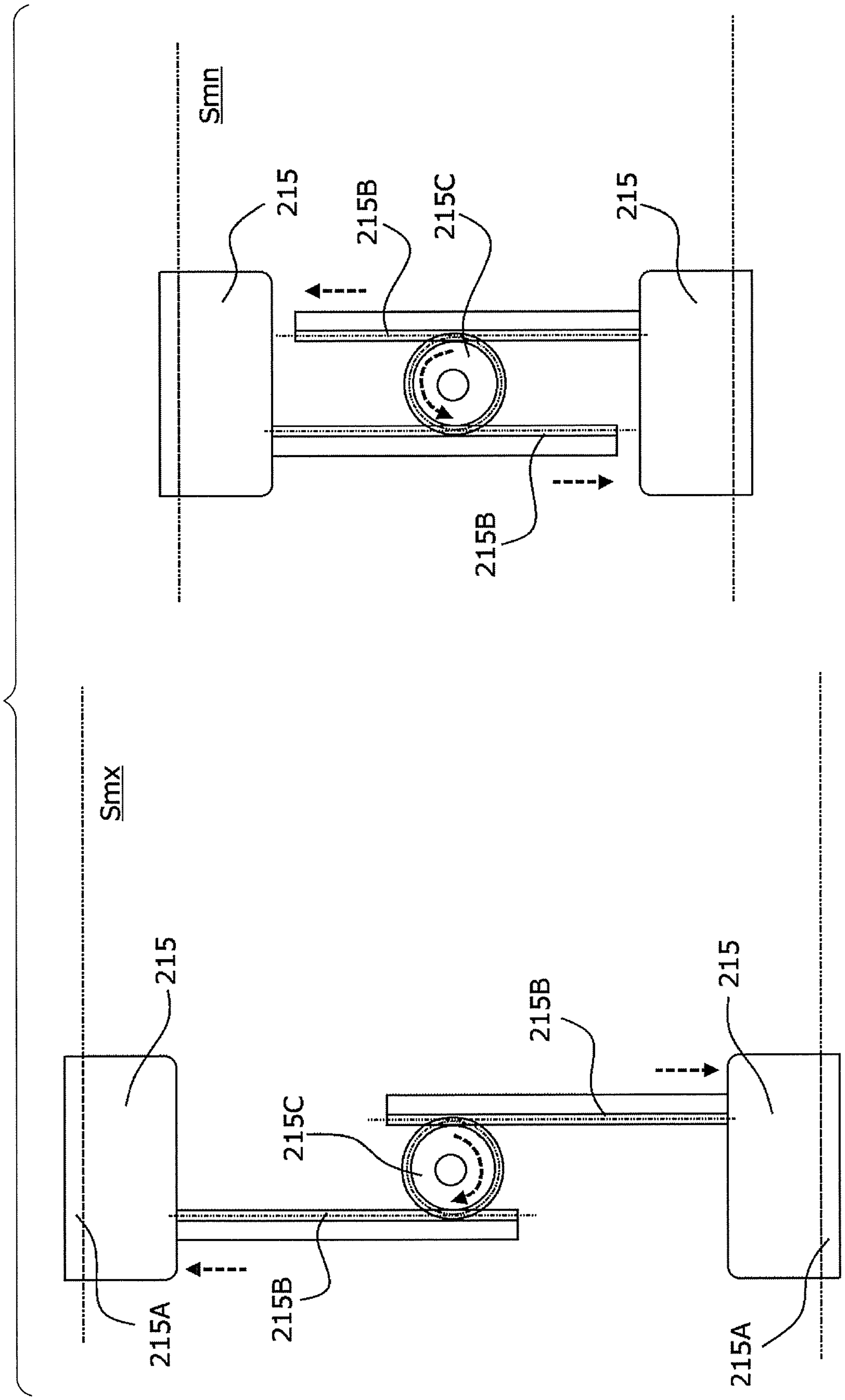
FIG. 4 is a plan view schematically illustrating the configuration of side guides in a sheet load section.
Figure 5:
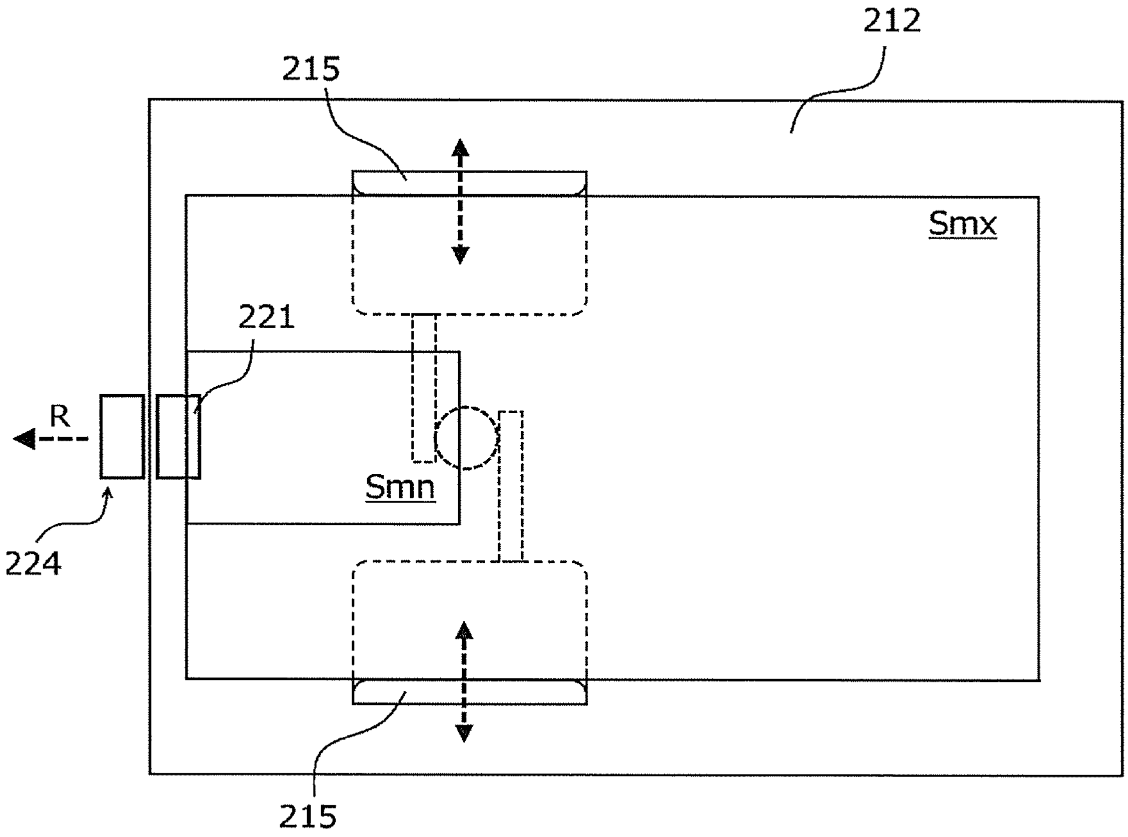
FIG. 5 is a plan view schematically illustrating how a sheet is placed on the sheet load section.
Figure 6A:
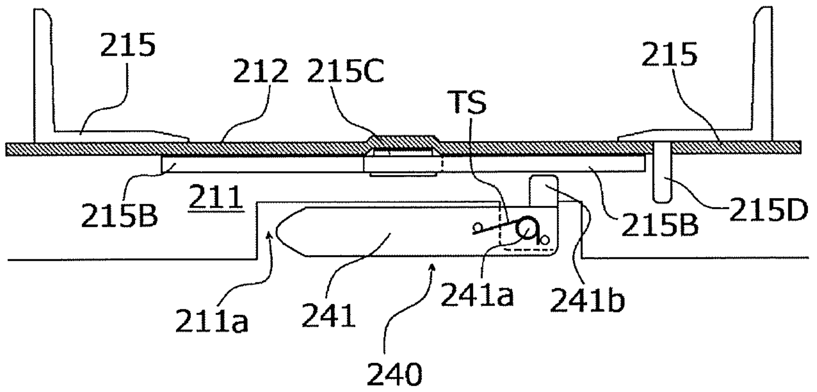
FIGS. 6A and 6B are cross-sectional views schematically illustrating the configuration and operation of a pressing mechanism, FIG. 6A being a cross-sectional view illustrating a pressing member in an accommodated state, FIG. 6B being a cross-sectional view illustrating the pressing member in a rotated state.
Figure 6B:
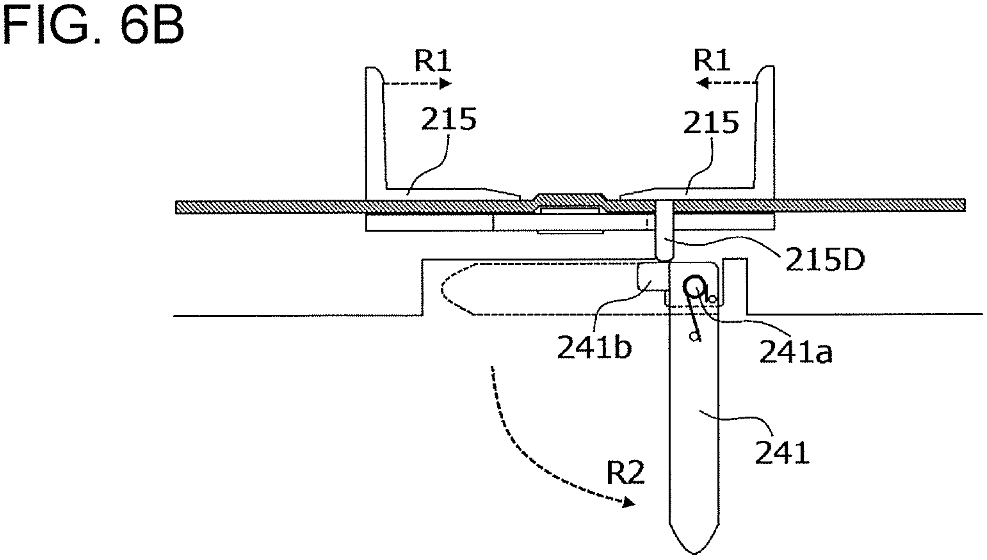
Figure 7:
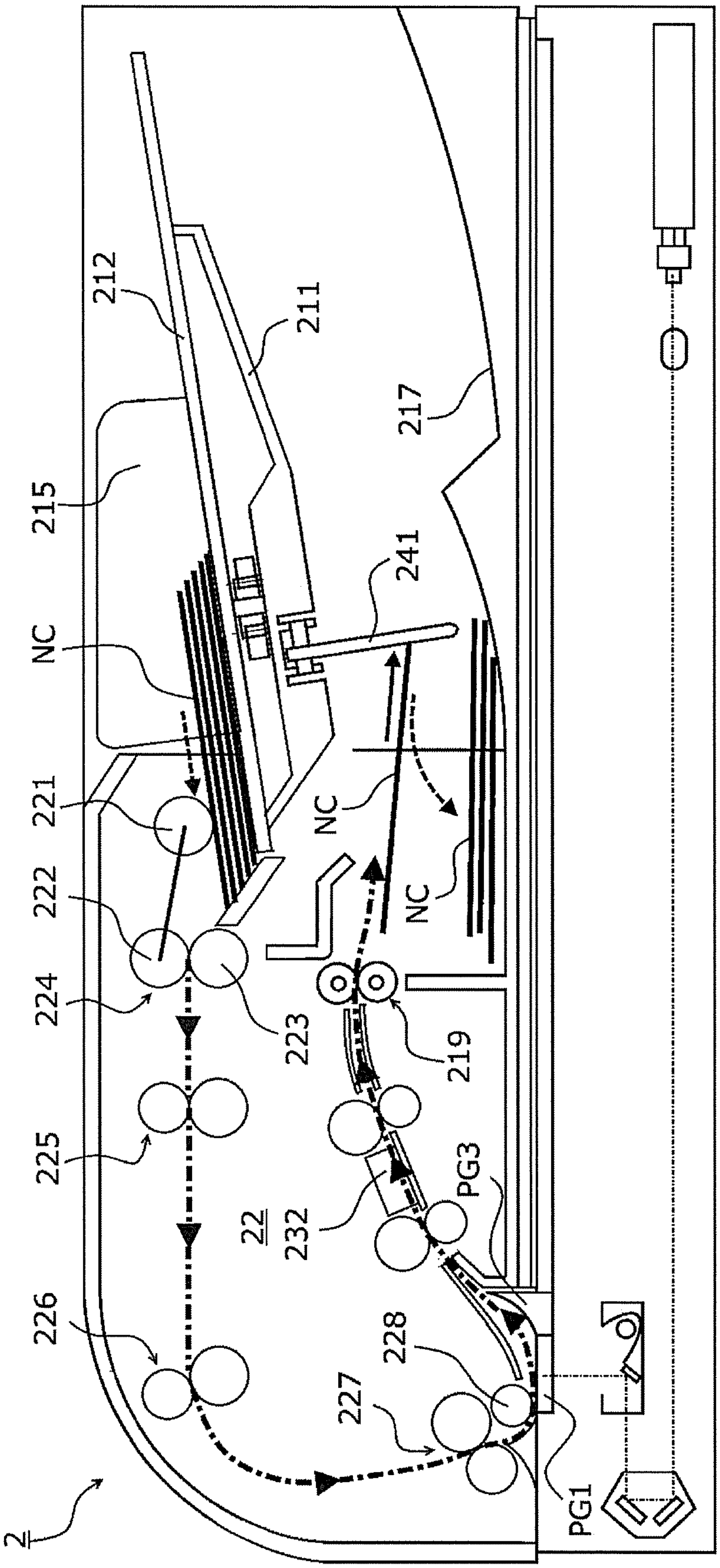
FIG. 7 is a cross-sectional view schematically illustrating how small-size sheets are output.

FIG. 4 is a plan view schematically illustrating the configuration of side guides 215 in the sheet load section 21. FIG. 5 is a plan view schematically illustrating how a sheet S is placed on the sheet load section 21. FIGS. 6A and 6B are cross-sectional views schematically illustrating the configuration and operation of a pressing mechanism 240. Specifically, FIG. 6A is a cross-sectional view illustrating a pressing member in an accommodated state, and FIG. 6B is a cross-sectional view illustrating the pressing member in a rotated state. FIG. 7 is a cross-sectional view schematically illustrating how small-size sheets are output. The configuration and operation of the sheet load section 21 will be described below with reference to the drawings.

2.1. Configuration of Sheet Load Section

The sheet load section 21 has the sheet tray 212 as an example of a sheet load tray and is capable of holding sheets of various sizes, that is, sheets with different dimensions with respect to at least one of a sheet length corresponding to a distance in the sheet transport direction (see an arrow R in FIG. 5) and a sheet width corresponding to a distance in the direction intersecting (orthogonal to) the sheet transport direction.

The pair of side guides 215 as an example of a side-edge positioning unit are disposed on a sheet placement surface 212*a* of the sheet tray 212 in a movable manner in the direction intersecting (orthogonal to) the sheet transport direction, such that a center registration method is employed in which the side edges in the sheet width direction are aligned in the width direction with reference to the side guides 215.

As shown in FIG. 4, the side guides 215 face each other in the width direction of the sheet S and are connected to each other by a rack-and-pinion mechanism. In detail, with regard to each of the side guides 215, a rack 215B extending in the moving direction is integrated with a regulating section 215A and is connected in engagement with a pinion 215C rotatably disposed on the tray body 211. According to this rack-and-pinion mechanism, one of the side guides 215 is moved in conformity to the size of the sheet S (see arrows in FIG. 4), so that the pair of side guides 215 move in conjunction with each other to decrease or increase the distance therebetween.

As schematically shown in FIG. 5, when a maximum-size sheet Smx placed on the sheet tray 212 is changed to a minimum-size sheet Smn, the side guides 215 are moved in conformity to the size so that the sheet S is positioned in the width direction based on the center registration method.

2.2. Assembly Configuration of Pressing Mechanism with Respect to Sheet Tray

FIGS. 6A and 6B illustrate an assembly configuration of a pressing mechanism 240 as an example of a regulating unit. When the side guides 215 move to positions corresponding to the minimum width of a sheet S, the pressing mechanism 240 operates to cause a stopper 241 thereof to regulate the output position of the sheet S by rotating to a position where it is capable of colliding with the downstream edge of the sheet S to be output in the output direction.

The pressing mechanism 240 has a rotation shaft 241*a* at one end thereof, and is constituted of the stopper 241 serving as a plate member extending in one direction, an integrally-formed protrusion 215D extending downward (i.e., −Z direction) at the rack 215B side of one of the side guides 215, and an arm 241*b* protruding toward the rotation shaft 241*a* of the stopper 241. The stopper 241 is rotatably supported by the tray body 211 via the rotation shaft 241*a*.

As shown in FIG. 6A, in a state where the protrusion 215D provided on one of the side guides 215 is not in contact with the arm 241*b*, that is, in a state where the side guides 215 are located at positions other than the positions corresponding to the minimum width of the sheet S, the stopper 241 is biased by a torsion spring TS attached to the rotation shaft 241*a* so as to be accommodated in a recess 211*a* provided in the tray body 211.

Then, as shown in FIG. 6B, when the side guides 215 move to the positions corresponding to the minimum width of the sheet S, the protrusion 215D provided on one of the side guides 215 comes into contact with the arm 241*b* protruding from the stopper 241. This causes the stopper 241 to rotate about the rotation shaft 241*a* (see an arrow R2 in FIG. 6B) and to thus protrude to a position where the stopper 241 is capable of colliding with the downstream edge of the sheet S to be output in the output direction.

2.3. Function of Pressing Mechanism

Figure 12:
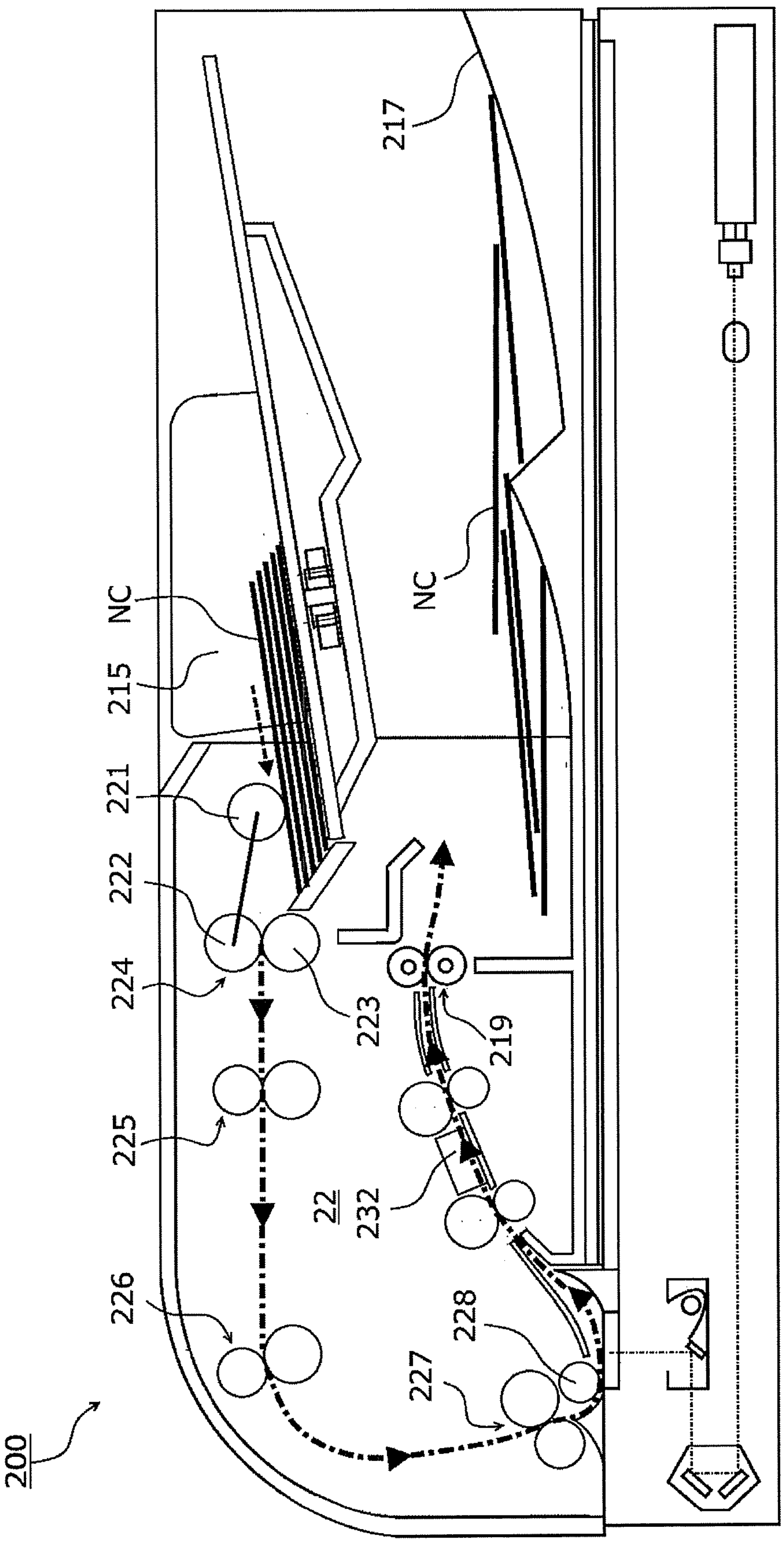
FIG. 12 illustrates how small-size sheets are transported and output to an output section in an image reading device according to a comparative example not equipped with a pressing mechanism.

FIG. 12 illustrates how small-size sheets are transported and output to the output section 217 in an image reading device 200 according to a comparative example not equipped with a pressing mechanism.

As an example of sheets S having the minimum width, business cards NC are placed on the sheet tray 212. The side guides 215 are positioned at the opposite side edges of the business cards NC, and a reading process is commenced. The business cards NC on the sheet tray 212 are fed by the nudger roller 221 in a state where they are positioned in the width direction by the side guides 215, and are transported one-by-one to the image reader 23.

Each business card NC whose image is read by the image reader 23 is output by the output roller 229 to the output section 217 provided below the sheet load section 21. Unlike a normal sheet, a business card NC has a smaller size but has a larger basis weight and higher rigidity than plain paper. In a case where business cards NC with a small sheet size (i.e., minimum size) and high rigidity are to be output by the output roller 229, the trailing edge of each business card NC is output to a position, on the output section 217, distant from the output roller 229. In this case, as schematically shown in FIG. 12, the business cards NC tend to be output and stacked disorderly on the output section 217, possibly altering the proper order of the business cards NC.

FIG. 7 illustrates how small-size sheets are transported and output to the output section 217 in the image reading device 2 according to this exemplary embodiment equipped with the pressing mechanism 240.

When the business cards NC having the minimum width are placed on the sheet tray 212 of the sheet load section 21 and the side guides 215 are moved to the positions corresponding to the minimum width in accordance with the positions at the opposite side edges of the business cards NC, the stopper 241 rotates so as to protrude to the position where it collides with the leading edge of the sheet S to be output. When the reading process is commenced, the business cards NC on the sheet tray 212 are fed by the nudger roller 221 in a state where the business cards NC are positioned in the width direction by the side guides 215, and are transported one-by-one to the image reader 23.

Each business card NC whose image is read by the image reader 23 is output by the output roller 229 to the output section 217 provided below the sheet load section 21. In this case, as shown in FIG. 7, the stopper 241 protrudes to the output trajectory of the business card NC at a position downstream of the output roller 229 in the sheet output direction and close to the output roller 229, such that the business card NC collides with the stopper 241 before being stacked on the output section 217. Accordingly, the business cards NC as small-size sheets may be output onto the output section 217 without the proper order thereof being altered, and disorderly orientation of output sheets may be suppressed.

Modification

Figure 8A:
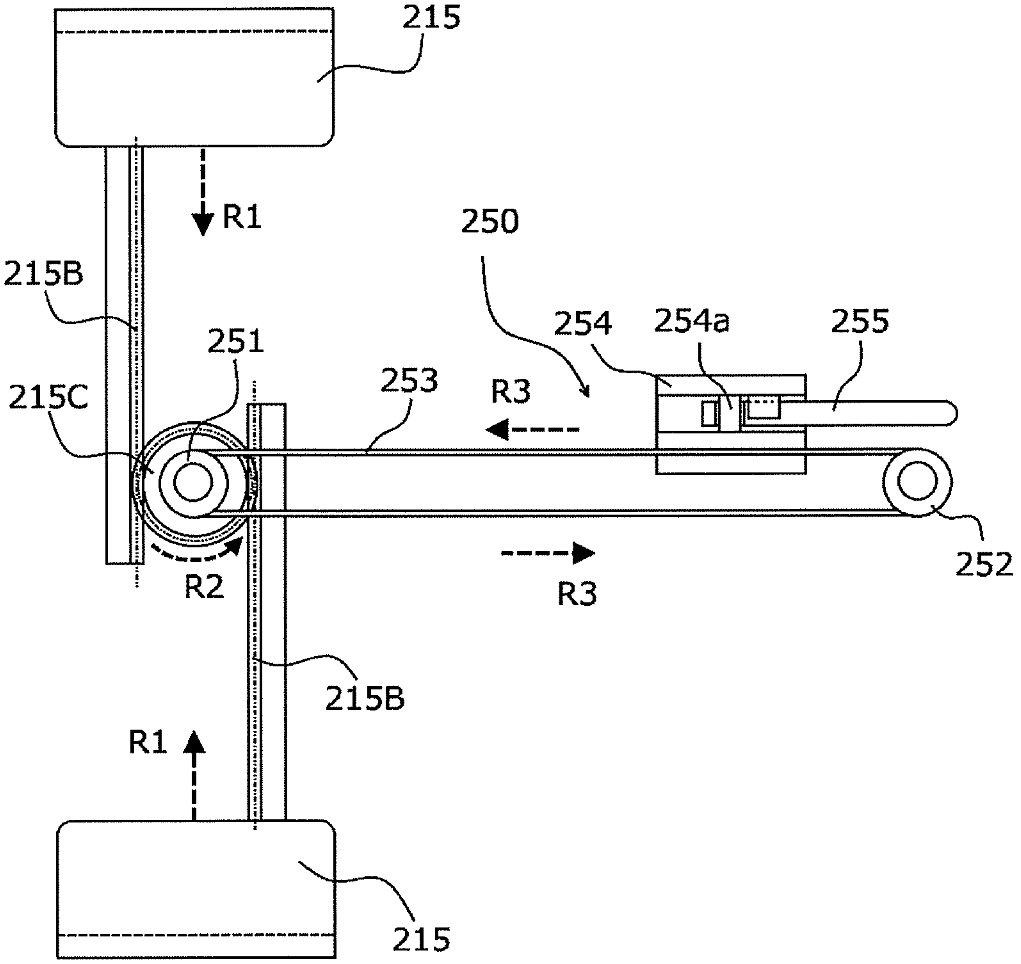
FIGS. 8A and 8B are cross-sectional views schematically illustrating the configuration of a pressing mechanism according to a modification and operation performed on a sheet other than a small-size sheet.
Figure 8B:
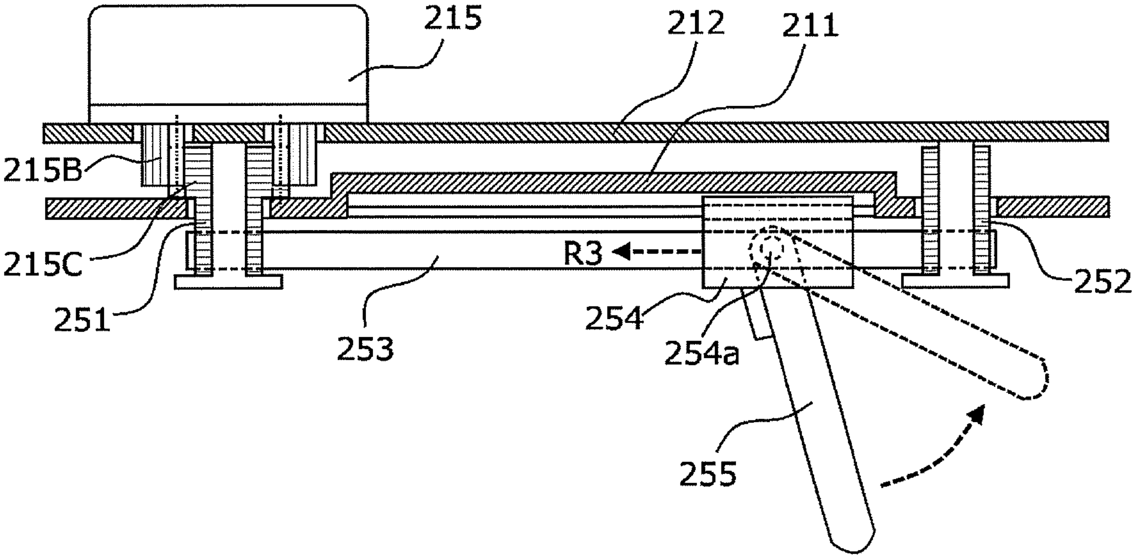
Figure 9A:
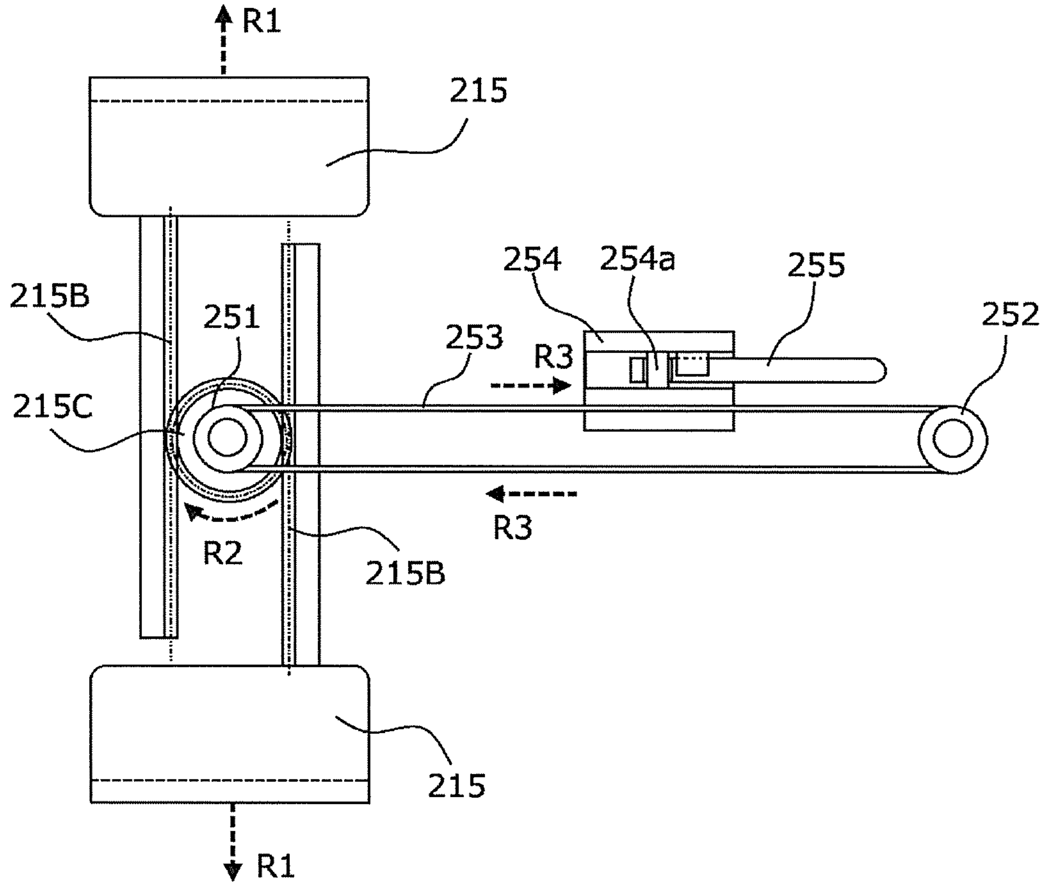
FIGS. 9A and 9B are cross-sectional views schematically illustrating the configuration of the pressing mechanism according to the modification and operation performed on a small-size sheet.
Figure 9B:
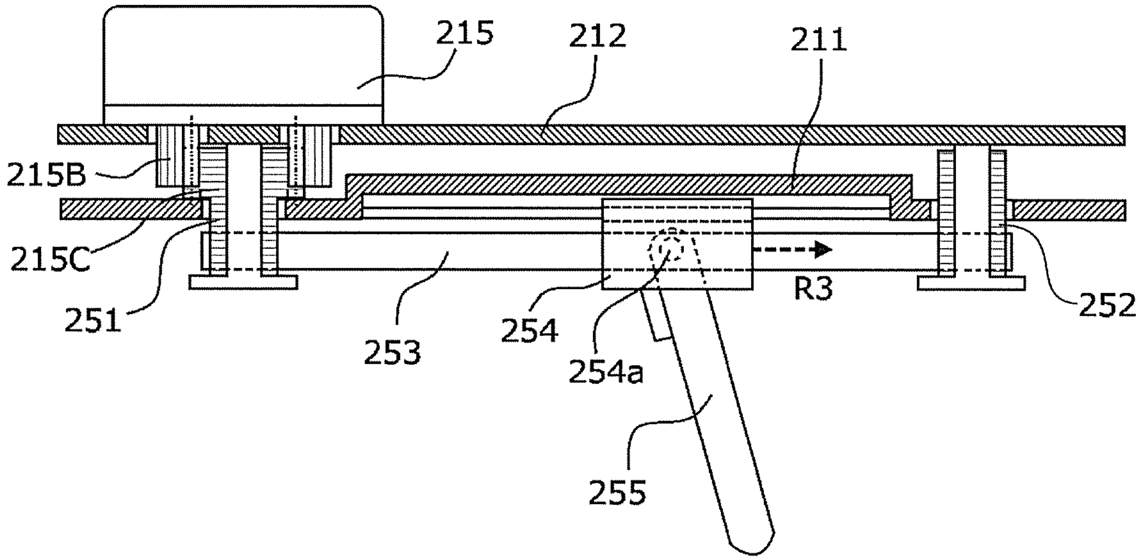
Figure 10:
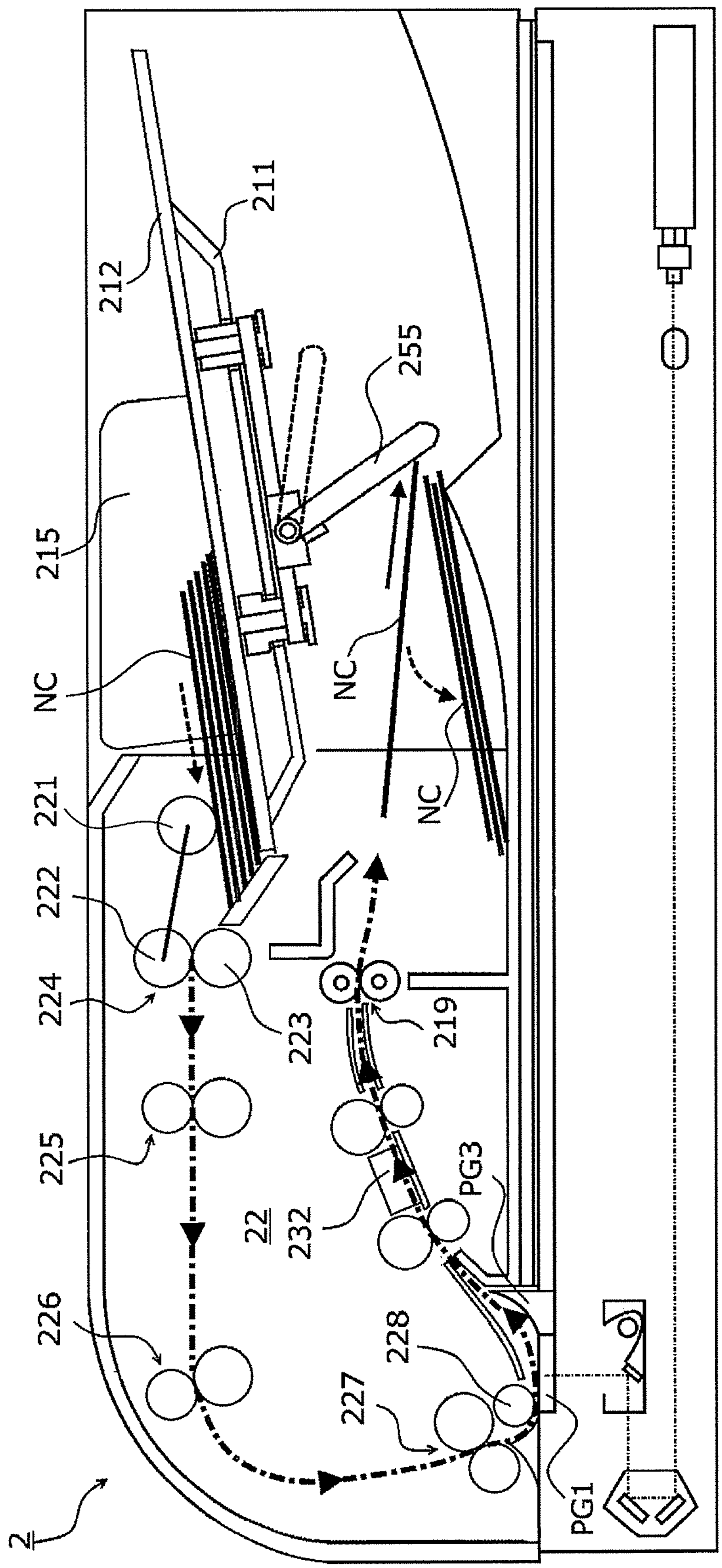
FIG. 10 is a cross-sectional view schematically illustrating how small-size sheets are output.
Figure 11:
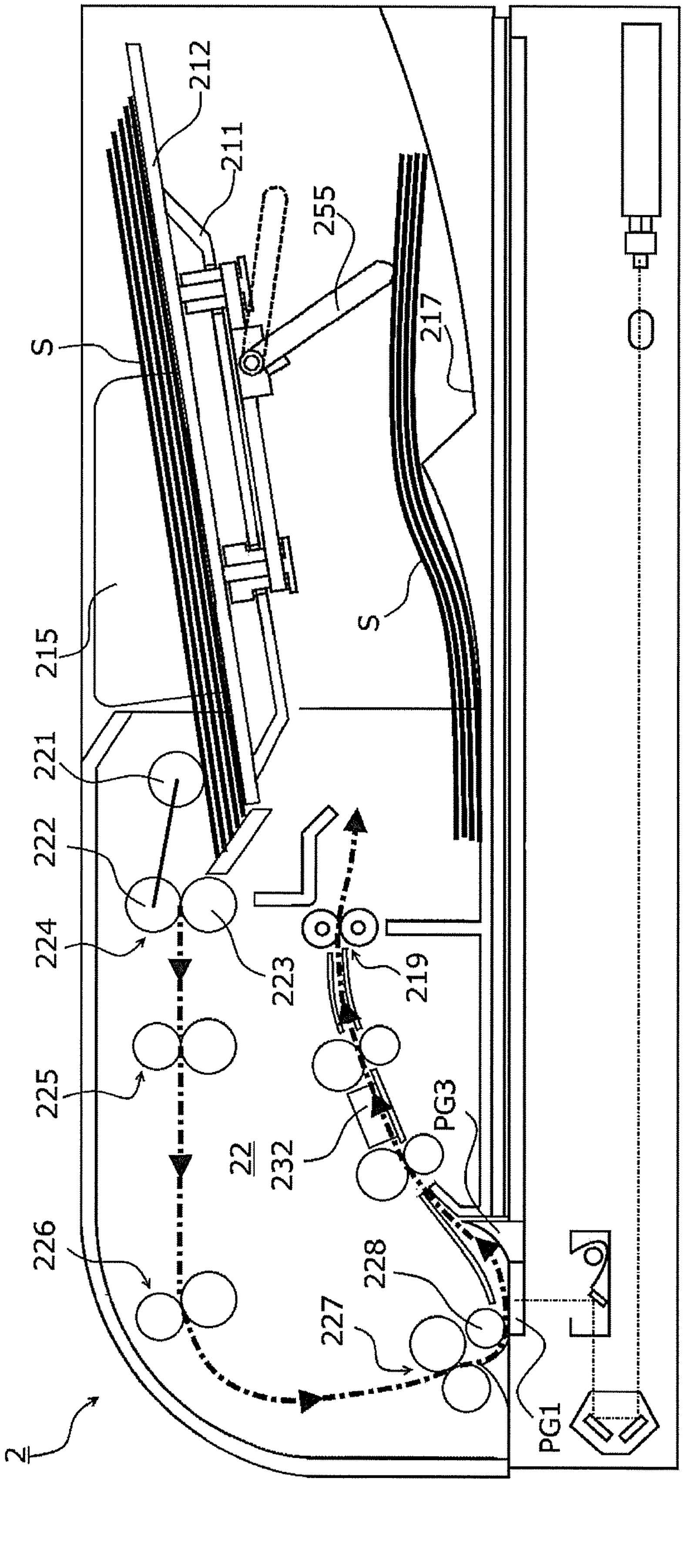
FIG. 11 is a cross-sectional view schematically illustrating how sheets other than small-size sheets are output.

FIGS. 8A and 8B are cross-sectional views schematically illustrating the configuration of a pressing mechanism 250 according to a modification and operation performed on a sheet other than a small-size sheet. FIGS. 9A and 9B are cross-sectional views schematically illustrating the configuration of the pressing mechanism 250 according to the modification and operation performed on a small-size sheet. FIG. 10 is a cross-sectional view schematically illustrating how small-size sheets are output. FIG. 11 is a cross-sectional view schematically illustrating how sheets other than small-size sheets are output.

The pressing mechanism 250 according to this modification is provided at the lower surface of the tray body 211 in a movable manner in the sheet output direction. When the side guides 215 move to positions corresponding to the minimum width of a sheet S, the pressing mechanism 250 operates to cause a stopper 255 thereof to regulate the output position of the sheet S by moving to a position where it is capable of colliding with the downstream edge of the sheet S to be output in the output direction.

FIG. 8A is a diagram for explaining the configuration of the pressing mechanism 250 and schematically illustrates the interior of the tray body 211 without showing the tray body 211 and the sheet tray 212.

The pressing mechanism 250 includes a first pulley 251 integrated with the pinion 215C of the rack-and-pinion mechanism of the side guides 215, a second pulley 252 rotatably provided downstream of the sheet tray 212 in the sheet feeding direction, a belt member 253 wound between the first pulley 251 and the second pulley 252, a retaining member 254 fixed to the belt member 253, and the stopper 255 rotatably retained by the retaining member 254 via a rotation shaft 254*a* downstream in the output direction of the sheet S to be output.

With regard to the pressing mechanism 250, when the side guides 215 move to decrease the distance therebetween in the width direction of the sheet S (see arrows R1 in FIG. 8A), the pinion 215C engaged with the racks 215B rotates, thus causing the first pulley 251 integrated with the pinion 215C to rotate (see an arrow R2 in FIG. 8A). When the first pulley 251 rotates, the belt member 253 wound therearound moves within the rotational range of the first pulley 251 (see arrows R3 in FIG. 8A), and the retaining member 254 fixed to the belt member 253 moves upstream in the sheet feeding direction together with the belt member 253.

Consequently, when the side guides 215 move to the positions corresponding to the minimum width of the sheet S, the stopper 255 moves upstream in the output direction to a position where it is capable of colliding with the downstream edge of the sheet S to be output in the output direction, thereby regulating the output position of the sheet S.

With regard to the pressing mechanism 250, when the side guides 215 move to increase the distance therebetween in the width direction of the sheet S (see arrows R1 in FIG. 9A), the pinion 215C engaged with the racks 215B rotates, thus causing the first pulley 251 integrated with the pinion 215C to rotate (see an arrow R2 in FIG. 9A). When the first pulley 251 rotates, the belt member 253 wound therearound moves within the rotational range of the first pulley 251 (see arrows R3 in FIG. 9A), and the retaining member 254 fixed to the belt member 253 moves downstream in the sheet feeding direction together with the belt member 253.

Consequently, when the side guides 215 move to the positions corresponding to a width other than the minimum width of the sheet S, the stopper 255 moves downstream in the output direction to a position where it is capable of colliding with the downstream edge of the sheet S to be output in the output direction, thereby regulating the output position of the sheet S other than a minimum-size sheet.

FIG. 10 illustrates how business cards NC as minimum-size sheets are transported and output to the output section 217 in the image reading device 2 equipped with the pressing mechanism 250 according to the modification.

When the business cards NC having the minimum width are placed on the sheet tray 212 and the side guides 215 are moved to the positions corresponding to the minimum width in conformity to the minimum sheet width, the stopper 255 moves upstream in the output direction of the sheet S together with the movement of the belt member 253 so as to regulate the output position of the sheet S at a position where the stopper 255 is capable of colliding with the downstream edge of the sheet S to be output in the output direction.

When the reading process is commenced, the business cards NC on the sheet tray 212 are fed by the nudger roller 221 in a state where the business cards NC are positioned in the width direction by the side guides 215, and are transported one-by-one to the image reader 23. Each business card NC whose image is read by the image reader 23 is output by the output roller 229 to the output section 217 provided below the sheet load section 21.

In this case, as shown in FIG. 10, the stopper 255 protrudes to the output trajectory of the business card NC at a position downstream of the output roller 229 in the sheet output direction and close to the output roller 229, such that the business card NC collides with the stopper 255 before being stacked on the output section 217. Accordingly, the business cards NC as small-size sheets may be output onto the output section 217 without the proper order thereof being altered, and disorderly orientation of output sheets may be suppressed.

FIG. 11 illustrates how sheets S other than minimum-size sheets are transported and output to the output section 217 in the image reading device 2 equipped with the pressing mechanism 250 according to the modification.

When sheets S other than minimum-size sheets are placed on the sheet tray 212 and the side guides 215 are moved in conformity to the positions corresponding to the sheet width, the stopper 255 moves downstream in the output direction of the sheet S together with the movement of the belt member 253 so as to regulate the output position of the sheet S at a position where the stopper 255 is capable of colliding with the downstream edge of the sheet S to be output in the output direction.

When the reading process is commenced, the sheets S on the sheet tray 212 are fed by the nudger roller 221 in a state where the sheets are positioned in the width direction by the side guides 215, and are transported one-by-one to the image reader 23. Each sheet S whose image is read by the image reader 23 is output by the output roller 229 to the output section 217 provided below the sheet load section 21.

In this case, as shown in FIG. 11, the stopper 255 protrudes to the output trajectory of the sheet S at a position downstream of the output roller 229 in the sheet output direction and distant from the output roller 229, such that the sheet S collides with the stopper 255 before being stacked on the output section 217. Accordingly, sheets S other than small-size sheets may be stacked on the output section 217 in a state where disorderly orientation of output sheets are suppressed.

According to the sheet load section 21 according to this exemplary embodiment, when the side guides 215 move to the positions corresponding to the minimum width of a sheet S, the stopper 241 of the pressing mechanism 240 regulates the output position of the sheet S by rotating to a position where it is capable of colliding with the downstream edge of the sheet S to be output in the output direction. Furthermore, when the side guides 215 move to the position corresponding to the minimum width of a sheet S, the stopper 255 regulates the output position of the sheet S by moving to a position where it is capable of colliding with the downstream edge of the sheet S to be output in the output direction. Accordingly, disorderly orientation of small-size sheets output on the output tray may be suppressed, as compared with a configuration not equipped with a regulating unit that regulates the output position of a sheet by rotating or moving a stopper thereof to a position where it is capable of colliding with the downstream edge of the sheet to be output in the output direction.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet transport device comprising:

a sheet load tray on which a sheet is loaded;

a side-edge positioning unit that comes into contact with a side edge of the sheet in a direction intersecting a sheet transport direction of the sheet loaded on the sheet load tray at an upper surface of the sheet load tray and that positions the side edge of the sheet to a normal position; and a regulating unit that is provided in a rotatable manner about a rotation shaft at a lower surface of the sheet load tray and that regulates an output position of the sheet by rotating a stopper of the regulating unit to a position where the stopper is capable of colliding with a downstream edge of the sheet to be output in an output direction when the side-edge positioning unit moves to a position corresponding to a minimum width of the sheet, wherein the side-edge positioning unit has a protrusion protruding in a direction intersecting a moving direction, and wherein when the side-edge positioning unit moves to the position corresponding to the minimum width of the sheet, the side-edge positioning unit comes into contact with an arm extending outward from the rotation shaft of the regulating unit so as to cause the stopper of the regulating unit to rotate to the position where the stopper is capable of colliding with the downstream edge of the sheet to be output in the output direction.

2. An image reading device comprising:

an imaging unit that reads an image of a sheet; and the sheet transport device according to claim 1 that transports the sheet to a read position where the imaging unit reads the sheet.

3. An image forming apparatus comprising:

the image reading device according to claim 2 that reads an image of a sheet; and an image recorder that records the image read by the image reading device onto a recording medium.

4. A sheet transport device comprising:

a sheet load tray on which a sheet is loaded;

a side-edge positioning unit that comes into contact with a side edge of the sheet in a direction intersecting a sheet transport direction of the sheet loaded on the sheet load tray at an upper surface of the sheet load tray and that positions the side edge of the sheet to a normal position; and a regulating unit that is provided in a rotatable manner about a rotation shaft at a lower surface of the sheet load tray and that regulates an output position of the sheet by rotating a stopper of the regulating unit to a position where the stopper is capable of colliding with a downstream edge of the sheet to be output in an output direction when the side-edge positioning unit moves to a position corresponding to a minimum width of the sheet, wherein when the side-edge positioning unit is located at a position other than the position corresponding to the minimum width of the sheet, the stopper of the regulating unit rotates to a position where the stopper does not collide with the downstream edge of the sheet to be output in the output direction, so as to be accommodated at the lower surface of the sheet load tray.

5. A sheet transport device comprising:

a sheet load tray on which a sheet is loaded;

a pair of side-edge positioning units that come into contact with side edges of the sheet in a direction intersecting a sheet transport direction of the sheet loaded on the sheet load tray at an upper surface of the sheet load tray and that position the side edges of the sheet to normal positions; and a regulating unit that is provided in a movable manner in a sheet output direction at a lower surface of the sheet load tray and that regulates an output position of the sheet by moving a stopper of the regulating unit upstream in the output direction to a position where the stopper is capable of colliding with a downstream edge of the sheet to be output in the output direction when the side-edge positioning units move to positions corresponding to a minimum width of the sheet.

6. The sheet transport device according to claim 5, wherein the side-edge positioning units have a rack-and-pinion mechanism, wherein when an operation for moving a first one of the side-edge positioning units is performed, the rack-and-pinion mechanism transmits an operational force to a second one of the side-edge positioning units so as to move the pair of side-edge positioning units in opposite directions from each other, and wherein when the side-edge positioning units move to the positions corresponding to the minimum width of the sheet, the regulating unit attached to one end of a belt member wound around a pinion of the rack-and-pinion mechanism moves upstream in the output direction, in accordance with movement of the belt member, to the position where the regulating unit is capable of colliding with the downstream edge of the sheet to be output in the output direction.

7. The sheet transport device according to claim 6, wherein the regulating unit is rotatable downstream in the output direction of the sheet to be output.

8. The sheet transport device according to claim 5, wherein the regulating unit is rotatable downstream in the output direction of the sheet to be output.

* * * * *